United States Patent
Xiang

(10) Patent No.: US 10,356,162 B2
(45) Date of Patent: Jul. 16, 2019

(54) SYSTEM AND METHOD FOR GENERIC SERVICE NFV ORCHESTRATION AND MANAGEMENT FOR CONVERGED SERVICES

(71) Applicant: Futurewei Technologies, Inc., Plano, TX (US)

(72) Inventor: Zhixian Xiang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 635 days.

(21) Appl. No.: 14/881,569

(22) Filed: Oct. 13, 2015

(65) Prior Publication Data
US 2016/0105332 A1    Apr. 14, 2016

Related U.S. Application Data

(60) Provisional application No. 62/063,826, filed on Oct. 14, 2014.

(51) Int. Cl.
| | |
|---|---|
| G06F 15/16 | (2006.01) |
| H04L 29/08 | (2006.01) |
| H04L 12/24 | (2006.01) |

(52) U.S. Cl.
CPC ............ H04L 67/10 (2013.01); H04L 41/12 (2013.01); H04L 41/5045 (2013.01); H04L 41/5054 (2013.01)

(58) Field of Classification Search
CPC ..... H04L 67/10; H04L 41/12; H04L 41/5045; H04L 41/5054
See application file for complete search history.

(56) References Cited

U.S. PATENT DOCUMENTS

| | | | |
|---|---|---|---|
| 2010/0118716 A1 | 5/2010 | Lakkis et al. | |
| 2013/0039345 A1 | 2/2013 | Kim et al. | |

(Continued)

FOREIGN PATENT DOCUMENTS

| | | |
|---|---|---|
| CN | 103595451 A | 2/2014 |
| CN | 103875191 A | 6/2014 |

(Continued)

OTHER PUBLICATIONS

ETSI Industry Specification Group, "Network Function Virtualization (NFV) Management and Orchestration," Group Specification, GS NFV-MAN 001, V0.6.4, Oct. 2014, 197 pages.

(Continued)

*Primary Examiner* — Moustafa M Meky
(74) *Attorney, Agent, or Firm* — Slater Matsil, LLP

(57) ABSTRACT

A system and method for network functions virtualization management and orchestration includes a virtualized infrastructure manager, a network functions virtualization orchestrator coupled to the virtualized infrastructure manager, a virtual network function manager coupled to the network functions virtualization orchestrator, one or more dedicated network services coupled to the network functions virtualization orchestrator, the one or more dedicated network services being orchestrated by the network functions virtualization orchestrator in accordance with a generic network service descriptor, and one or more dedicated network functions coupled to the virtual network function manager, the virtual network function manager configured to manage the dedicated network functions in accordance with a generic network function descriptor.

21 Claims, 6 Drawing Sheets

(56) References Cited

U.S. PATENT DOCUMENTS

2013/0172002 A1 7/2013 Yu et al.
2017/0150399 A1* 5/2017 Kedalagudde ........ H04W 28/08
2017/0257276 A1* 9/2017 Chou .................. H04L 41/0896

FOREIGN PATENT DOCUMENTS

| CN | 104025469 A | 9/2014 |
| CN | 104050045 A | 9/2014 |
| WO | 2014110453 A1 | 7/2014 |

OTHER PUBLICATIONS

ETSI Industry Specification Group "Network Functions Virtualisation (NFV); Virtual Network Functions Architecture," Group Specification, Draft ETSI GS NFV-SWA 001, V0.2.1, Aug. 2014, 92 pages.
ETSI Industry Specification Group, "Network Function Virtualization (NFV) Managment and Orchestration," Group Specification, GS NFV-MAN 001, V0.8.1, Nov. 2014, 189 pages.
ETSI Industry Specification Group, "Network Functions Virtualization (NFV); Architectural Framework," Group Specification, ETSI GS NFV 002, V1.1.1, Oct. 2013, 21 pages.

\* cited by examiner

SYSTEM AND METHOD FOR GENERIC SERVICE NFV ORCHESTRATION AND MANAGEMENT FOR CONVERGED SERVICES

This application claims the benefit of U.S. Provisional Application No. 62/063,826, filed on Oct. 14, 2014, entitled "System and Method for Generic Service NFV Orchestration and Management for Converged Service," which application is hereby incorporated herein by reference.

TECHNICAL FIELD

The present invention relates generally to virtual networks, and, in particular embodiments, to a system and method for generic service NFV orchestration and management for converged services.

BACKGROUND

Network function virtualization (NFV) is the principle of separating network functions from the hardware they run on by using virtual hardware abstraction. NFV is an industry effort to virtualize network equipment using a general hardware platform, to provide cost reduction, operation efficiency, and agility for new services. The European Telecommunications Standards Institute (ETSI) NFV Industry Specification Group (ISG) is developing a framework for NFV.

A virtual network has a finite quantity of resources. These resources must be coordinated and managed in order to ensure optimal allocation, which may be necessary to achieve proper connectivity. The network services that a virtual network operates must have their lifecycles properly managed. A network functions virtualization management and orchestration (NFV-MANO) system manages and coordinates virtual network functions and their respective network function virtualization infrastructures (NFVI). Current NFV-MANO systems are a single entity, which makes them unsuited for certain network realities in cloud computing systems.

SUMMARY OF THE INVENTION

Technical advantages are generally achieved, by embodiments of this disclosure, which describe systems and methods for generic service NFV orchestration and management for converged services.

In accordance with an embodiment, a system for network functions virtualization management and orchestration is provided. The system includes a virtualized infrastructure manager (VIM), a network functions virtualization orchestrator (NFVO) coupled to the VIM. a virtual network function manager (VNFM) coupled to the NFVO, one or more dedicated network services coupled to the NFVO, the one or more dedicated network services being orchestrated by the NFVO in accordance with a generic network service descriptor, and one or more dedicated network functions coupled to the VNFM, the VNFM configured to manage the dedicated network functions in accordance with a generic network function descriptor.

In accordance with another embodiment, a method for managing a virtual network is provided. The method comprises receiving a generic descriptor, the generic descriptor comprising a common management function, receiving an instruction to perform the common management function, and performing a dedicated management function in accordance with the instruction and the generic descriptor.

In accordance with yet another embodiment, a method for orchestrating a virtual network is provided. The method comprises receiving an instruction to orchestrate resources for a network service, allocating network function virtualization (NFV) infrastructure resources according to the instruction received, selecting a generic network service according to the NFV infrastructure resources allocated, and orchestrating a dedicated network service according to the selected generic network service.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
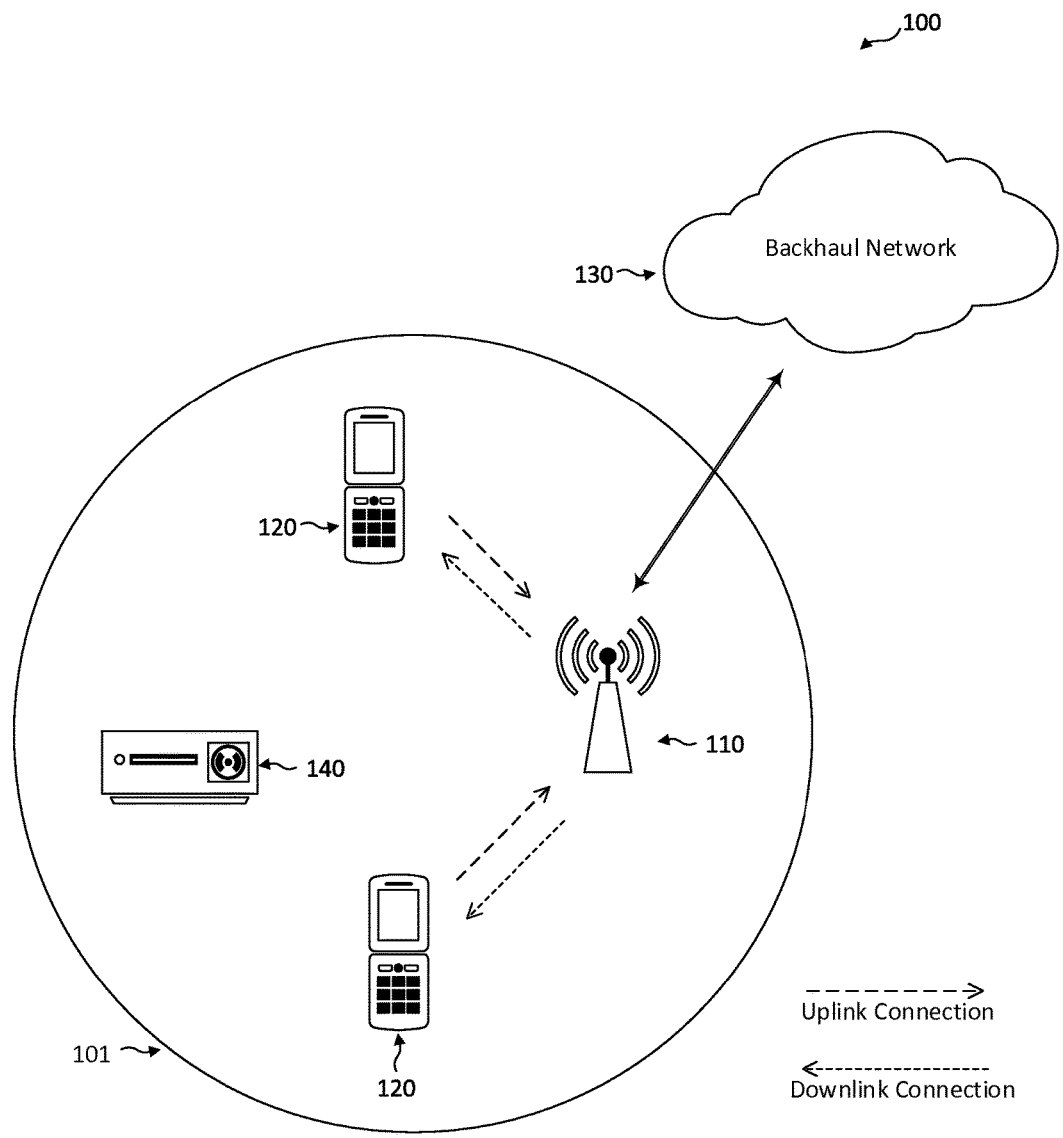
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein are systems and methods for orchestrating and managing NFV using generic network services and data models. NFV deals with many types of underlying network services. Each network service may interact with functionality defined by a standards body or an outside vendor to form different end-to-end (E2E) services, e.g., a mobility management entity (MME), packet gateway (PGW), serving gateway (SGW), and the like. Many implementation details for a network service may be handled by NFV.

Virtualized network functionality must be properly managed. A network function virtualization orchestrator (NFVO) helps create and manage virtual network functionality. It may create and coordinate virtual network functions according to a desired lifecycle, the network demand, available resources, and/or the like. Likewise, a virtualized network function manager (VNFM) is responsible for the lifecycle management of virtual network functionality once it has been created.

Current NFV-MANO proposals locate all management and orchestration responsibilities in a single location and network. These proposals do not embrace the reality that network services are often not all owned or operated by the same network that a MANO operates within. Instead, network services are frequently set up by different departments or, e.g., rented from cloud providers. Examples of cloud providers of network services may include AT&T, Amazon's AWS, Microsoft's Azure, and the like. A converged MANO that locates some portions of itself in a local network and other portions in a cloud network allows resources to be more effectively allocated and scaled. For example, an embodiment MANO may locate service orchestration and management in a local network, while resource orchestration and management may be located in a cloud network. This configuration addresses the reality that cloud resources often exist in different networks and are managed by different organizations than those of the local network components.

Further, as more and more types of networks are created, access technology-agnostic applications and services need to be supported. There are many E2E services that may need to support both mobile and fixed network capabilities. Different types of NFV may be required for each E2E service that a network needs to support. Therefore, a different NFVO, VNFM, and virtual infrastructure manager (VIM) may be needed for each type of network service. This multiplicity of orchestration and management devices in a network is not desirable. An embodiment MANO may abstract orchestration and management to a generic network service and data model. Dedicated services may then implement the details of these generic services for each network service. Such a system allows service orchestration and resource orchestration systems to operate without knowing implementation details of one another. This separation of concerns may allow for greater operator flexibility, and more intelligent virtual network function allocation and management. This increased flexibility may allow for fasted development of virtual network functionality and increased collaboration with other service delivery organizations.

FIG. 1 illustrates a network 100 for communicating data. The network 100 comprises a base station 110 having a coverage area 101, a plurality of mobile devices 120, a backhaul network 130, and a NFV-MANO system 140. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macrocell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

The NFV-MANO system 140 may be a standalone device in the network 100, or it may be co-located with another device in the network 100. While the NFV-MANO system 140 is illustrated as a single item in FIG. 1, it could be spanned across several device in an the network 100. Additionally, as discussed below, while the NFV-MANO system 140 is shown entirely in the network 100, it should be noted that in some embodiments it could span several networks.

Figure 2:
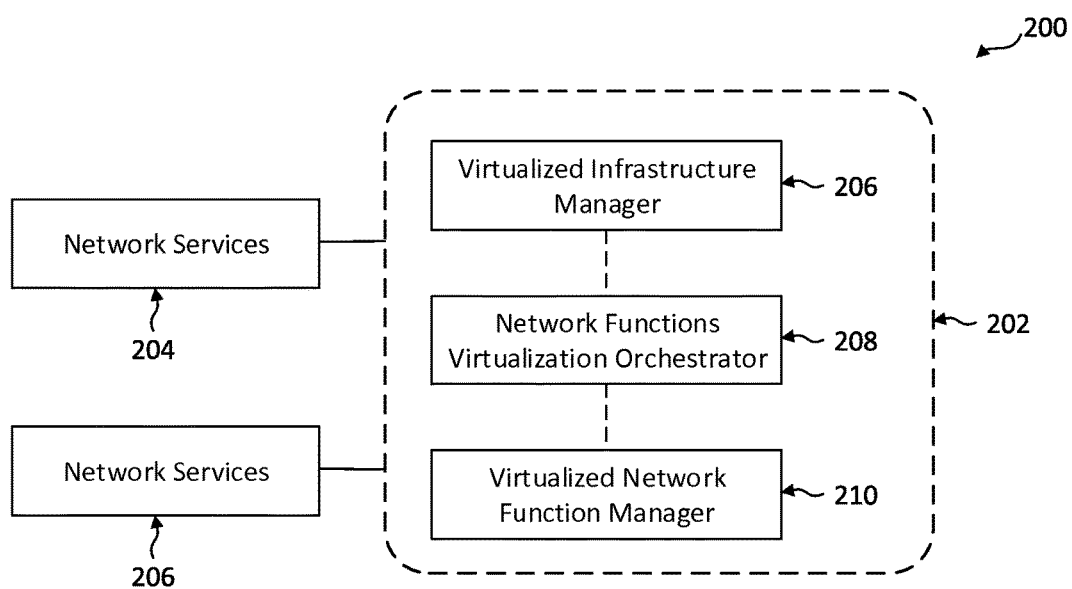
FIG. 2 illustrates an embodiment virtual network.

FIG. 2 illustrates an embodiment virtual network 200. The virtual network 200 comprises NFV-MANO system 202 and a plurality of network services 204, 206. The NFV-MANO system 202 may be indicative of functionality in the NFV-MANO system 140. The network services 204, 206 are illustrated as two blocks in FIG. 2, but it should be appreciated that in some embodiments there may be many network services 204, 206 connected to the NFV-MANO system 202, and these network services 204, 206 may comprise a variety of different components. For example, there may be services for a fixed network or a mobile network connected to and managed by the NFV-MANO system 202, which may contain orchestrators and managers for each network service.

The embodiment NFV-MANO system of FIG. 2 comprises a VIM 205, a NFVO 208, and a VNFM 210. FIG. 2 shows all three of these components being co-located in the same device. The VIM 205 performs operation, management, and coordination of virtual network functionality. It also coordinates virtual network functionality with respective infrastructures for each NFV. The VIM 205 may be located within the network of a content or service provider. In some embodiments, the VIM 205 is located in a cloud provider's network.

The NFVO 208 may be a functional block that manages lifecycles of network services. It coordinates and manages those lifecycles, in addition to other aspects of the virtual network functionality. Further, it also manages and coordinates resource allocation in order to ensure optimal allocation of resources within the network function virtualization infrastructure by the VIM. In some embodiments, it may control scaling up or scaling out of resources in a cloud computing infrastructure.

The VNFM 210 may be a functional block that manages lifecycles of virtual networks. It may coordinate with the VIM to and with the NFVO to ensure that virtual network elements are created and destroyed (e.g., by the NFVO) when necessary. The NFVO may be located in a local or a cloud network. Alternatively, as discussed below, the NFVO may instead comprise several components, with some being located in a local network and some being located in a cloud network.

Figure 3A:
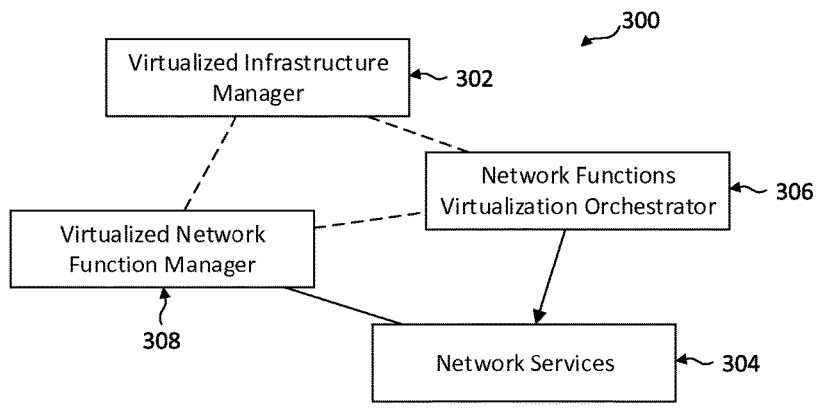
FIGS. 3a-3c illustrate an embodiment network functions virtualization management and orchestration (NFV-MANO) system.

FIG. 3a illustrates an embodiment NFV-MANO system 300. The NFV-MANO system 300 comprises a VIM 302, network services 304, a NFVO 306, and a VNFM 308. As discussed above with respect to FIG. 2, the VIM 302 may perform core management for the network. However, unlike the network illustrated in FIG. 2, the NFV-MANO system 300 is not contained within a single device or network. For example, the VIM 302, portions of the NFVO 306, and portions of the VNFM 308 may be in a cloud network, while other portions of the NFVO 306 and the VNFM 308 may be in a local or a provider network. The NFV-MANO system 300 shown in FIG. 3a is a flexible design that is not meant to be constrained to specific hardware, software, and/or network configurations.

As discussed above, the network services 304 may comprise many diverse network services and functions. These network services may be orchestrated to form an E2E service. The specific network services and interfaces that need to be orchestrate in order to form an E2E service may be defined in a specification, e.g., 3GPP. For example, in an embodiment where a mobile 3GPP service is to be formed, the network services 304 orchestrated may include, e.g., a mobility management entity (MME), a packet gateway (PGW), and/or a serving gateway (SGW).

As will be discussed below, with respect to FIGS. 3b-3c, the NFVO 306 and the VNFM 308 may be abstracted to manage and orchestrate generic network services and dedicated network services. This allows management components of the network to operate on the generic network services, while the NFVO 306 and/or VNFM 308 translate the generic service commands to dedicated service commands. As a result, some portions of the network do not need knowledge of how the network services 304 are managed and orchestrated.

Figure 3B:
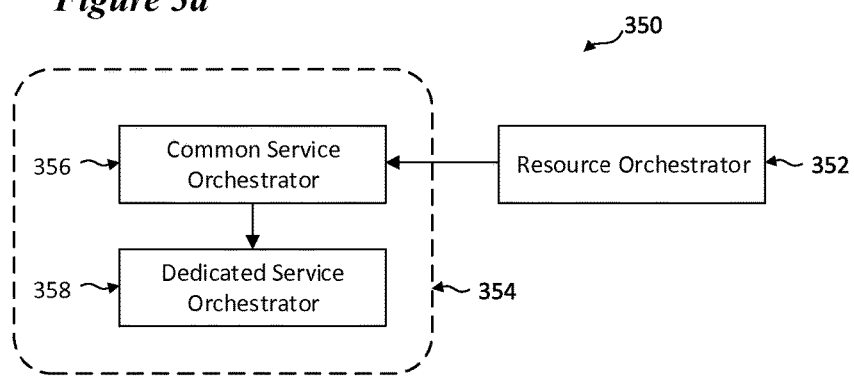

FIG. 3b illustrates an embodiment network function virtualization orchestrator (NFVO) 350. The NFVO 350 may be illustrative of the NFVO 306 in FIG. 3a. In order to form an E2E service in a network, the NFVO 350 may be further subdivided into several orchestration elements. The NFVO 350 may further comprise a resource orchestrator 352 and a service orchestrator 354. These different orchestrator functions may be located in the same device on a network, different devices on a network, or different devices across different networks. For example, the resource orchestrator 352 may be located in a first cloud network, while the service orchestrator 354 maybe located in a different cloud network.

In order to accommodate the many different network services needed to form different E2E services, the service orchestrator 354 may be abstracted to a common service orchestrator 356 and a dedicated service orchestrator 358. The common service orchestrator 356 may communicate with the resource orchestrator 352 using a generic language or protocol. The dedicated service orchestrator 358 may interact directly with the resource orchestrator 352, or it may interact with the common service orchestrator 356 to orchestrate virtual resources to meet certain needs of the virtual network. When a request for an E2E service is made to the resource orchestrator 352, the common service orchestrator 356 may communicate with the dedicated service orchestrator 358 to fashion the desired E2E service using the known details of particular network services, such as 3GPP mobility services, cable services, fixedline services, Tele-Management Forum (TMF) services, and/or Broadband Forum (BBF) fixed network services. The dedicated service orchestrator 358 is responsible for creating a dedicated (i.e., service-specific) network service descriptor. The dedicated network service descriptor may be associated with a specific technology, standards organization, open source community, etc. It may also be created based on parameters associated with a business domain, or specific vendor's solution. The created dedicated service descriptor may be a subset of a generic service description, so that other components of the NFV-MANO do not need to know specific details of the underlying network service. It should be noted, however, that the service orchestrator 354 is not necessarily separated into common and dedicated service orchestrators. In some embodiments, both service orchestrators may be located together on a device or network.

The resource orchestrator 352 may interact with the common service orchestrator 356 according to a defined data model. The data model may contain certain fields and information. In some embodiments, the common service orchestrator 356 interacts with the dedicated service orchestrator 358 using the same data model. In some embodiments, the common service orchestrator 356 and/or dedicated service orchestrator 358 may communicate with a subset of the data model. This subset may be similar to the data model used in the resource orchestrator 352, but may also add service-specific information and parameters. These parameters may be called for by, e.g., the standards organization associated with the dedicated service orchestrator invoked. For example, a 3GPP network may call for other parameters, in accordance with a 3GPP standard, in addition to parameters in the generic data model.

The interface between the common service orchestrator 356 and the dedicated service orchestrator 358 may be sub-divided into further layers of dedicated service orchestrators. This extra abstraction may allow for further granularity in orchestrating the network services. The service description and data models may also be sub-divided in accordance with these layers of abstraction. So, for example, a first dedicated service orchestrator may call for a 3GPP network generally, and then a second dedicated service orchestrator invoked by the first one may call for an LTE network specifically. For example, the resource orchestrator 352 may tell the common service orchestrator 356, "Make an E2E network for mobile devices," without any knowledge of what kind of mobile network will be created. The common service orchestrator 356 may then decide that a 3GPP network should be created, and tell the dedicated service orchestrator 358, "Make a 3GPP network." The dedicated service orchestrator 358, using its knowledge of the network services and in accordance with the 3GPP specification, may then orchestrate a virtual 3GPP network and create a generic network descriptor for the network. This generic network descriptor may then be passed to a VNFM, e.g., the VNFM 308. This system of abstracted virtual resource creation allows the virtual network functions to be managed and orchestrated without knowledge of underlying details of a virtual network. For example, the service orchestrator 354 may be located in a cloud computing network, and so the resource orchestrator 352 may have no knowledge of the cloud network's capacities. By creating a generic service description, the resource orchestrator 352 can still orchestrate and manage E2E services in the cloud network. This separation of concerns allows additional network technologies to be added to the cloud network as they are created. For example, new network standards or open-source projects could contribute to new dedicated service orchestrators that are able to orchestrate new types of networks that the resource orchestrator 352 has no knowledge of. An abstracted service orchestrator allows the network services to change or improve without the resource orchestrator 352, the VIM 302, or the VNFM 308 needed knowledge of the changes. This will allow future networks to function without making changes to the VNFM or the resource orchestrator 352.

Figure 3C:
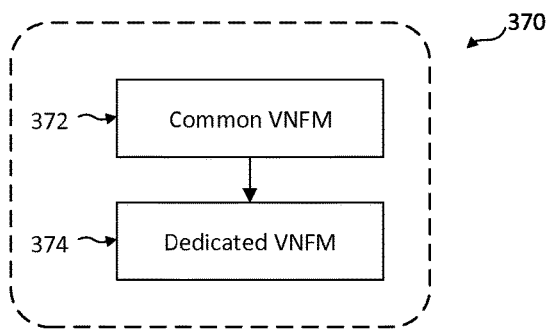

FIG. 3c illustrates an embodiment virtualized network function manager (VNFM) 370. The VNFM 370 may be illustrative of the VNFM 308 in FIG. 3a. The VNFM 370 comprises a common VNFM 372 and a dedicated VNFM 374. These different management functions may be located in one device on a network, or alternatively may be split across several devices and/or networks. For example, the common VNFM 372 may be located in a cloud network where the resource orchestrator 352 is located, while the dedicated VNFM 374 may be located in a local network where the service orchestrator 354 is located.

The common VNFM 372 manages common portions of the virtual network features. The common VNFM 372 may use a generic function description created by the service orchestrator 354. The generic function description may include generic functionality such as lifecycle management and interaction with common portions of the service orchestrator 354. Like the service orchestrator 354, the common VNFM 372 may use a common data model that may be shared by dedicated VNFMs (discussed below).

The dedicated VNFM 374 manages dedicated portions of the network services set up by the dedicated service orchestrator 358. Similar to the dedicated service orchestrator 358, the dedicated VNFM 374 may perform managing functions defined by organizations associated with certain network services, such as 3GPP or BBF. For LTE networks, an element manager for virtual network functionality may be integrated into the dedicated VNFM 374. The dedicated VNFM 374 may thus perform virtual network functionality instance lifecycle management, as described by various standards organizations, operators, vendors, and the like. Like the dedicated service orchestrator 358, the dedicated VNFM 374 may be sub-divided into further layers of dedicated VNFMs. This extra abstraction may allow for further granularity in managing the network services.

The dedicated VNFM 374 may communicate with virtual network functions that it manages using a similar function description and data model as that used to communicate with the common VNFM 372. These data models may include additional fields specific to the network services managed by the dedicated VNFM 374. The dedicated VNFM 374 may thus be a subset of the common VNFM 372 that is implemented and/or maintained by a particular vendor, business domain, or the like. Similar to the service orchestrator 354, the common VNFM 372 and the dedicated VNFM 374 may be combined on one device or implement separately by different vendors, organizations, etc.

Figure 4:
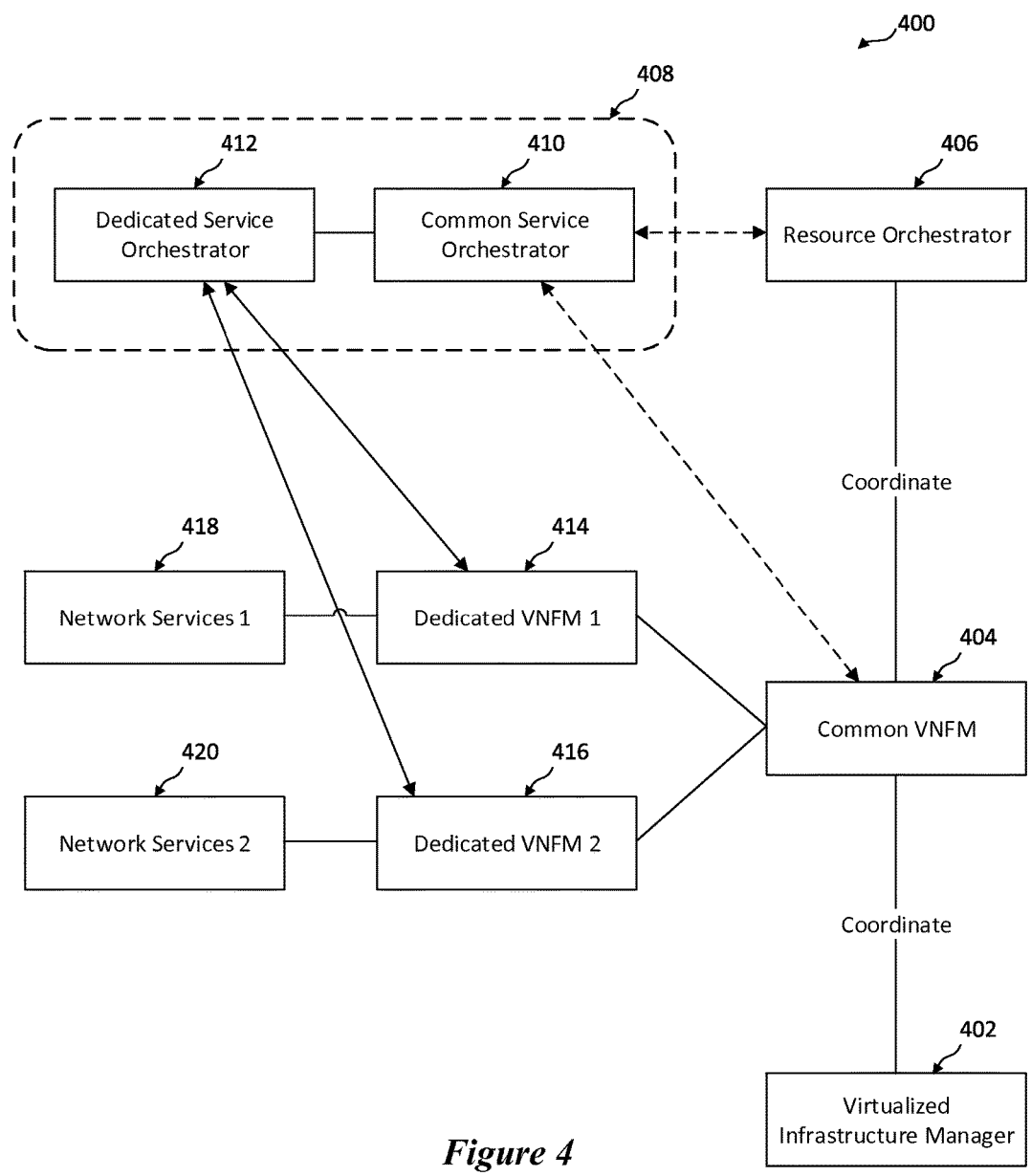
FIG. 4 illustrates a virtual communications network.

FIG. 4 illustrates an embodiment virtual communications network 400. The virtual communications network 400 includes a VIM 402, a common VNFM 404, a resource orchestrator 406, and a service orchestrator 408. As discussed above with respect to FIG. 3b, the resource orchestrator 406 and the service orchestrator 408 may be components of a NFVO that are implemented on different or the same networks. The VIM 402, common VNFM 404, resource orchestrator 406, and service orchestrator 408 may all communicate to manage and orchestrate and the virtual communications network 400.

The service orchestrator 408 comprises a common service orchestrator 410 and a dedicated service orchestrator 412, as discussed above with respect to FIG. 3b. The common service orchestrator 410 may communicate with the resource orchestrator 406 and the common VNFM 404 using a generic service description and data model, as illustrated with the dashed two-way arrows in FIG. 4. As discussed above with respect to FIGS. 3b-3c, the dedicated service orchestrator 412 may communicate with the common service orchestrator 410 using a service description and data model that are a subset of the generic service description and data model, but include additional data fields and descriptions that are specific to the virtual network functionality implemented by the dedicated service orchestrator 412.

The virtual communications network 400 further includes dedicated VNFMs 414, 416 and network services 418, 420. The common VNFM, dedicated VNFMs 414, 416, and network services 418, 420 may communicate with information models or with data models. An information model represents information exchanged between a VNFM and a NFVO, while a data model is an implementation of an information model that defines parameters of the information model in more detail. That is, an information model is a higher level, abstracted model that specific data models may implement. As discussed above, the dedicated VNFMs 414, 416 may communicate with the common VNFM using generic function descriptions and information models or data models, as illustrated with the solid two-way arrows in FIG. 4. Likewise, the dedicated VNFMs 414, 416 may communicate with the network services 418, 420 and/or the service orchestrator 408 using dedicated function descriptions and information models or data models. In some embodiments, these function descriptions and information models or data models may be similar to those used by the dedicated service orchestrator 412 to communicate with the common service orchestrator 410.

Figures 5, 6:
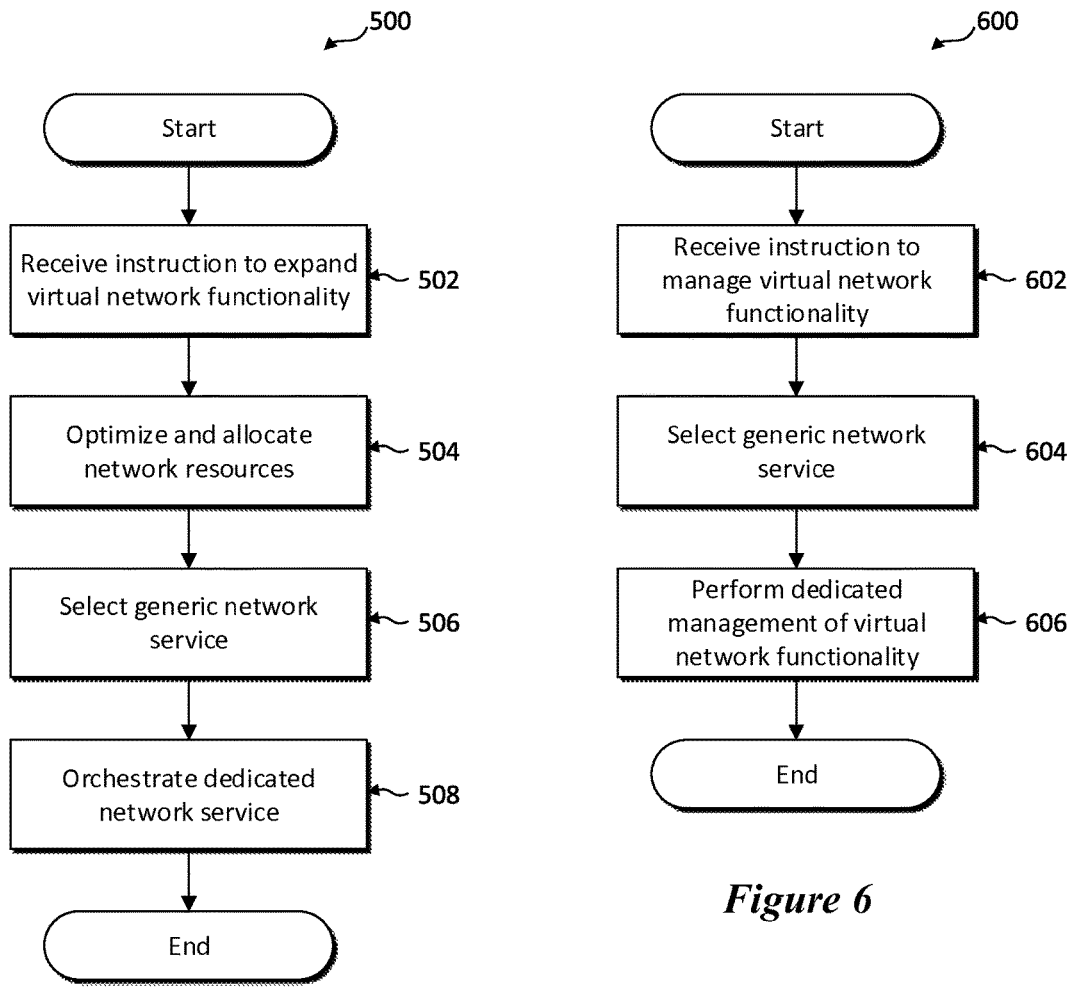
FIG. 5 illustrates an embodiment method for orchestrating virtual network functions.
FIG. 6 illustrates an embodiment method for managing virtual network functions.

FIG. 5 illustrates an embodiment method 500 for orchestrating virtual network functions. The method 500 may be indicative of operations occurring in the resource orchestrator 406 and/or the service orchestrator 408. The method 500 begins by receiving instructions to expand virtual network functionality in step 502. These instructions may be sent by, e.g., a VIM. The method 500 continues by optimizing and allocating resources in step 504. The method 500 continues by selecting a generic network service in step 506. This generic network service may communicate with a generic data model. The method 500 concludes by orchestrating a dedicated network service in instep 508. This dedicated network service may correspond to organization-or-vendor-specific network functionality.

FIG. 6 illustrates an embodiment method 600 for managing virtual network functions. The method 600 may be indicative of operations occurring in the common VNFM 404. The method 600 begins by receiving an instruction to manage virtual network functionality in step 602. These instructions may be sent by, e.g., a VIM. The method 600 continues by selecting a generic network service to manage in step 604. The method 600 concludes by performing dedicated management of virtual network functionality in step 606. This may be performed with the dedicated network service created in method 500.

Figure 7:
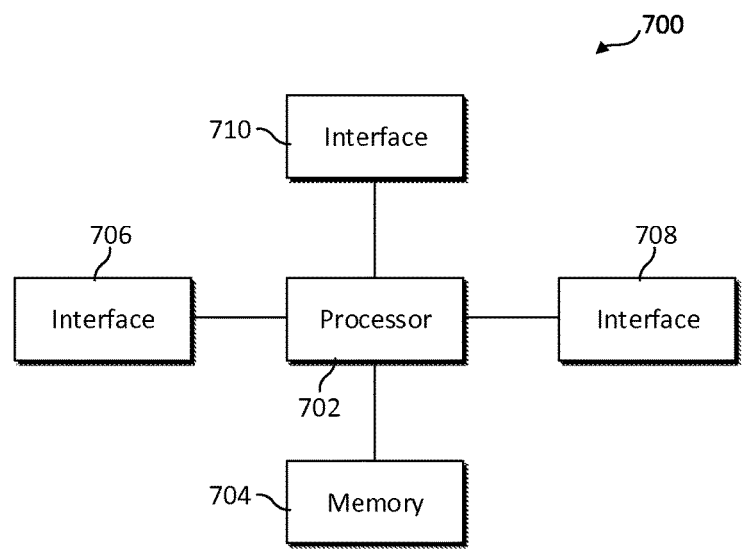
FIG. 7 illustrates a diagram of an embodiment processing system.

FIG. 7 illustrates a block diagram of an embodiment processing system 700 for performing methods described herein, which may be installed in a host device. As shown, the processing system 700 includes a processor 702, a memory 704, and interfaces 706, 708, 710, which may (or may not) be arranged as shown in FIG. 7. The processor 702 may be any component or collection of components adapted to perform computations and/or other processing related tasks, and the memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. For example, one or more of the interfaces 706, 708, 710 may be adapted to communicate data, control, or management messages from the processor 702 to applications installed on the host device and/or a remote device. As another example, one or more of the interfaces 706, 708, 710 may be adapted to allow a user or user device (e.g., personal computer (PC), etc.) to inter-act/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
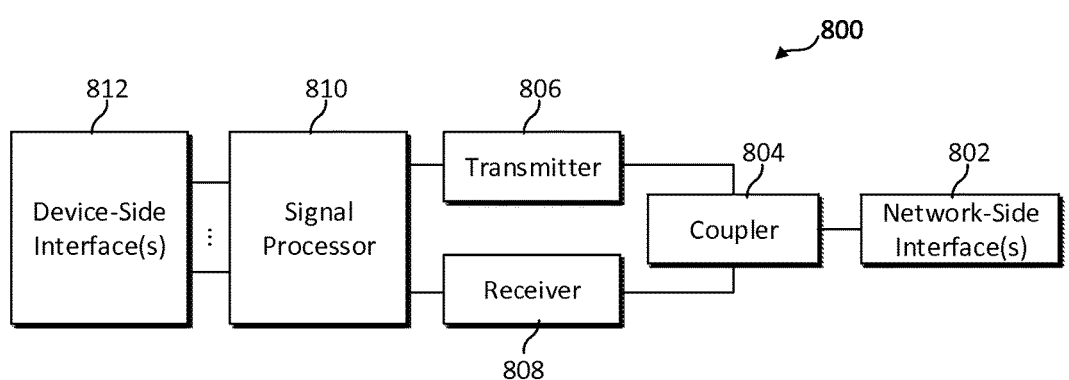
FIG. 8 illustrates a block diagram of a transceiver.

In some embodiments, one or more of the interfaces 706, 708, 710 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input single output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A network functions virtualization management and orchestration (NFV-MANO) system comprising:
 a virtualized infrastructure manager (VIM);
 a network functions virtualization orchestrator (NFVO) coupled to the VIM, wherein the NFVO comprises a resource NFVO in a first network and a service NFVO in a second network different from the first network;
 a virtual network function manager (VNFM) coupled to the NFVO;
 one or more dedicated network services coupled to the NFVO, the one or more dedicated network services being orchestrated by the NFVO in accordance with a generic network service descriptor; and
 one or more dedicated network functions coupled to the VNFM, the VNFM configured to manage the dedicated network functions in accordance with a generic network function descriptor.

2. The NFV-MANO system of claim 1, wherein the VNFM comprises a common VNFM and a plurality of dedicated VNFMs.

3. The NFV-MANO system of claim 2, wherein the common VNFM is configured to:
 receive the generic network function descriptor from the NFVO, the generic network function descriptor created in accordance with a dedicated VNFM of the plurality of dedicated VNFMs; and
 collaborate with the NFVO and the dedicated VNFM in accordance with the generic network service descriptor and the generic network function descriptor to create an end-to-end service.

4. The NFV-MANO system of claim 3, wherein the common VNFM and the NFVO communicate according to a first information model, and wherein the common VNFM and the dedicated VNFM communicate according a second information model, the first information model being a subset of the second information model.

5. The NFV-MANO system of claim 1, wherein the NFVO comprises a common NFVO and a plurality of dedicated NFVOs.

6. The NFV-MANO system of claim 5, wherein the common NFVO is configured to:
 create the generic network service descriptor in accordance with a dedicated NFVO of the plurality of dedicated NFVOs; and collaborate with the VNFM and the dedicated NFVO in accordance with the generic network service descriptor and the generic network function descriptor to create an end-to-end service.

7. The NFV-MANO system of claim 6, wherein the common NFVO and the VNFM communicate according to a first information model, and wherein the common NFVO and the dedicated NFVO communicate according a second information model, the first information model being a subset of the second information model.

8. The NFV-MANO system of claim 5, wherein each of the plurality of dedicated NFVOs are configured to create a dedicated network service descriptor in accordance with the generic network service descriptor.

9. The NFV-MANO system of claim 8, wherein the dedicated network service descriptor is a mobile service defined by 3GPP.

10. The NFV-MANO system of claim 1, wherein the one or more dedicated network services are selected from the group consisting of 3GPP, cable, fixedline, TeleManagement Forum, Broadband Forum, and combinations thereof.

11. The NFV-MANO system of claim 1, wherein the VIM, the NFVO, and the VNFM are each located on different devices in a network.

12. A network functions virtualization management and orchestration (NFV-MANO) system comprising:
a virtualized infrastructure manager (VIM);
a network functions virtualization orchestrator (NFVO) coupled to the VIM;
a virtual network function manager (VNFM) coupled to the NFVO, wherein the VNFM comprises a common VNFM and a plurality of dedicated VNFMs;
one or more dedicated network services coupled to the NFVO, the one or more dedicated network services being orchestrated by the NFVO in accordance with a generic network service descriptor; and
one or more dedicated network functions coupled to the VNFM, the VNFM configured to manage the dedicated network functions in accordance with a generic network function descriptor,
wherein the common VNFM is configured to:
receive the generic network function descriptor from the NFVO, the generic network function descriptor created in accordance with a dedicated VNFM of the plurality of dedicated VNFMs; and
collaborate with the NFVO and the dedicated VNFM in accordance with the generic network service descriptor and the generic network function descriptor to create an end-to-end service.

13. The NFV-MANO system of claim 12, wherein the common VNFM and the NFVO communicate according to a first information model, and wherein the common VNFM and the dedicated VNFM communicate according a second information model, the first information model being a subset of the second information model.

14. The NFV-MANO system of claim 12, wherein the one or more dedicated network services are selected from the group consisting of 3GPP, cable, fixedline, TeleManagement Forum, Broadband Forum, and combinations thereof.

15. The NFV-MANO system of claim 12, wherein the NFVO comprises a resource NFVO in a first network and a service NFVO in a second network different from the first network.

16. The NFV-MANO system of claim 12, wherein the VIM, the NFVO, and the VNFM are each located on different devices in a network.

17. A network functions virtualization management and orchestration (NFV-MANO) system comprising:
a virtualized infrastructure manager (VIM);
a network functions virtualization orchestrator (NFVO) coupled to the VIM, wherein the NFVO comprises a common NFVO and a plurality of dedicated NFVOs;
a virtual network function manager (VNFM) coupled to the NFVO;
one or more dedicated network services coupled to the NFVO, the one or more dedicated network services being orchestrated by the NFVO in accordance with a generic network service descriptor; and
one or more dedicated network functions coupled to the VNFM, the VNFM configured to manage the dedicated network functions in accordance with a generic network function descriptor,
wherein the common NFVO is configured to:
create the generic network service descriptor in accordance with a dedicated NFVO of the plurality of dedicated NFVOs; and
collaborate with the VNFM and the dedicated NFVO in accordance with the generic network service descriptor and the generic network function descriptor to create an end-to-end service.

18. The NFV-MANO system of claim 17, wherein the common NFVO and the VNFM communicate according to a first information model, and wherein the common NFVO and the dedicated NFVO communicate according a second information model, the first information model being a subset of the second information model.

19. The NFV-MANO system of claim 17, wherein the one or more dedicated network services are selected from the group consisting of 3GPP, cable, fixedline, TeleManagement Forum, Broadband Forum, and combinations thereof.

20. The NFV-MANO system of claim 17, wherein the NFVO comprises a resource NFVO in a first network and a service NFVO in a second network different from the first network.

21. The NFV-MANO system of claim 17, wherein the VIM, the NFVO, and the VNFM are each located on different devices in a network.

* * * * *